(12) United States Patent
Haumont et al.

(10) Patent No.: US 7,974,630 B1
(45) Date of Patent: Jul. 5, 2011

(54) RELEASING A CONNECTION IN A WIRELESS COMMUNICATION NETWORK

(75) Inventors: Serge Haumont, Helsinki (FI); Kalle Ahmavaara, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/980,376

(22) PCT Filed: May 9, 2000

(86) PCT No.: PCT/EP00/04231
§ 371 (c)(1),
(2), (4) Date: Mar. 20, 2002

(87) PCT Pub. No.: WO00/76243
PCT Pub. Date: Dec. 14, 2000

(30) Foreign Application Priority Data

Jun. 4, 1999 (GB) .................................. 9913092.4

(51) Int. Cl.
*H04W 72/00* (2009.01)
*H04M 11/00* (2006.01)

(52) U.S. Cl. .................. 455/450; 455/464; 455/405

(58) Field of Classification Search .................. 455/436, 455/442, 438, 439, 444, 445, 560, 561, 405; 370/331, 60
See application file for complete search history.

(56) References Cited

U.S. PATENT DOCUMENTS

| | | | | |
|---|---|---|---|---|
| 4,443,875 A | * | 4/1984 | Blausten | 370/410 |
| 5,345,448 A | * | 9/1994 | Keskitalo | 370/331 |
| 5,432,838 A | * | 7/1995 | Purchase et al. | 455/523 |
| 5,850,607 A | * | 12/1998 | Muszynski | 455/442 |
| 6,023,724 A | * | 2/2000 | Bhatia et al. | 709/218 |
| 6,119,000 A | * | 9/2000 | Stephenson et al. | 455/432.1 |
| 6,404,754 B1 | * | 6/2002 | Lim | 370/338 |
| 6,438,378 B1 | * | 8/2002 | Kouno | 455/439 |
| 6,507,567 B1 | * | 1/2003 | Willars | 370/321 |
| 6,574,473 B2 | * | 6/2003 | Rinne et al. | 455/436 |
| 6,643,262 B1 | * | 11/2003 | Larsson et al. | 370/236 |
| 6,725,038 B1 | * | 4/2004 | Subbiah | 455/436 |

FOREIGN PATENT DOCUMENTS

| | | |
|---|---|---|
| EP | 0 568 212 A2 | 4/1992 |
| EP | 0 888 022 A2 | 12/1998 |
| EP | 0 898 438 A2 | 2/1999 |
| GB | 2 313 259 A | 11/1997 |
| JP | 1238328 | 9/1989 |
| JP | 9055764 | 2/1997 |
| JP | 9271055 | 10/1997 |
| JP | 11122654 | 4/1999 |
| WO | WO 95/08898 | 3/1995 |
| WO | WO 99/27741 | 6/1999 |

OTHER PUBLICATIONS

Search Report for PCT/EP00/04231 dated Jun. 4, 1999.
International Preliminary Examination Report for PCT/EP00/04231 dated Aug. 22, 2001.

* cited by examiner

*Primary Examiner* — Lester Kincaid
*Assistant Examiner* — Joel Ajayi
(74) *Attorney, Agent, or Firm* — Alston & Bird LLP

(57) ABSTRACT

A network element, such as a radio network controller, for use in a communication network (e.g. UMTS), the network element being arranged between an end station and an end element, for example an SGSN, wherein connections are established between the end station and the end element via the network element, the network element determining if the connection between the end element and the end station is to be released.

53 Claims, 3 Drawing Sheets

RELEASING A CONNECTION IN A WIRELESS COMMUNICATION NETWORK

PRIORITY CLAIM

This is a U.S. national stage of application No. PCT/EP00/04231, filed on May 9, 2000. Priority is claimed on the following application Country: Great Britian, Application No. 9913092.4, Filed: Jun. 4, 1999.

FIELD OF THE INVENTION

The present invention relates to a network element for use in a communications network. In particular, but not exclusively, the network element is a radio network controller in a code division multiple access wireless cellular communications network.

BACKGROUND OF THE INVENTION

The use of code division multiple access (CDMA) is being proposed for the next generation of cellular telecommunication networks. Additionally, code division multiple access is also being used in the IS-95 standard in the USA. CDMA is a direct sequence spread spectrum technique. In a wireless cellular network using CDMA, the mobile stations in one cell associated with a first base station will use the same frequency as mobile stations in an adjacent cell associated with the second base station. The different mobile stations can be distinguished by the respective base stations as each mobile station will be using a different spreading code.

In one of the new CDMA standards which is currently being proposed, connections are made between a mobile station to a base station, from the base station to a radio network controller and from the radio network controller to a core network. The core network is arranged to control the establishment and release of connections between the mobile station and the core network. With "bursts" traffic which consists of packets of data which are sent irregularly, the core network is unable to predict the traffic which is to be transmitted between the core network and the mobile station and vice versa.

It has been proposed that a timer mechanism be used by the core network in order to control the release of the connection. For example, if a packet of data has not been received for X seconds, then the connection is released.

This method has the problem that the core network may not release this connection at an appropriate time. This is because the core network is not aware of parameters of the radio network controller or the mobile station which might indicate that an earlier break in the connection was appropriate. This may result in connections being maintained longer than required. This unnecessarily uses up resources within the network, which may reduce the amount of traffic which can be supported.

SUMMARY OF THE INVENTION

It is an aim of embodiments of the present invention to address this problem.

According to one aspect of the present invention, there is provided a network element for use in a communications network, said network element being arranged between a mobile station and an end element, wherein connections are established between said mobile station and said end element via said network element, said network element comprising means for determining if the connection between said end element and said mobile station is to be released.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

For better understanding of the present invention and as to how the same may be carried into effect, reference will now be made by way of example to the accompanying drawings in which:—

DETAILED DESCRIPTION OF EMBODIMENTS OF THE PRESENT INVENTION

Figure 1:
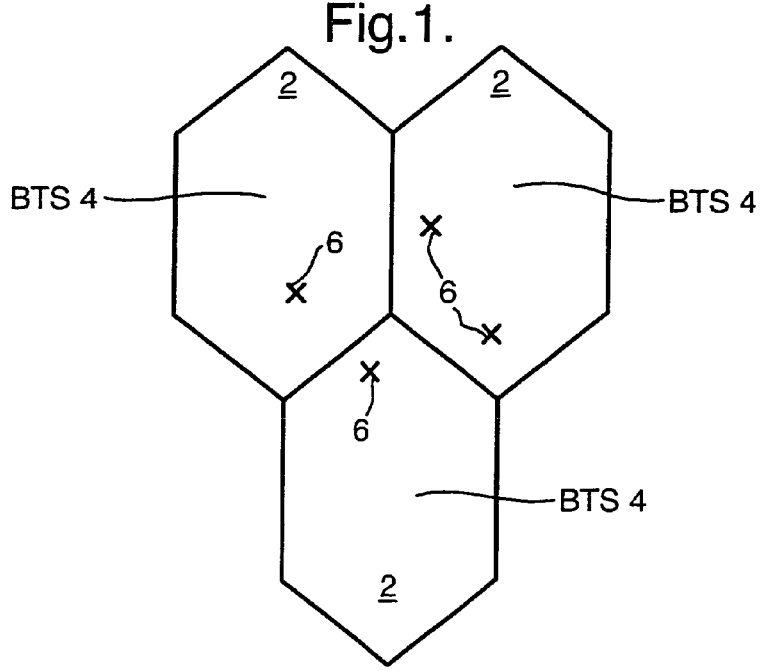
FIG. 1 shows a cellular telecommunication network in which embodiments of the present invention can be incorporated.

Reference will first be made to FIG. 1 in which three cells 2 of the cellular telecommunications network are shown. Each cell 2 is served by a respective base transceiver station (BTS) 4. The base station is sometimes called node B in CDMA systems. Each base transceiver station is arranged to transmit signals to and receive signals from the mobile stations 6 located in the cell associated with the given base transceiver station 4. Likewise, each mobile station 6 is able to transmit signals to and receive signals from the respective base transceiver station 4.

The cellular telecommunications network shown in FIG. 1 uses a code division multiple access technique.

With the proposed new CDMA standard, macro diversity is possible. This means that a mobile station can be connected to more than one radio network controller RNC at the same time. However, as far as the core network is concerned, these connections are controlled by one radio network controller which is defined as the serving radio network controller SRNC. This serving radio network controller SRNC communicates with a third generation serving GPRS support node 3G-SGSN. This serving GPRS support node is analogous to that of the GPRS standard used in conjunction with the GSM standard but has been modified so as to be usable with the CDMA standard.

Figure 2A:
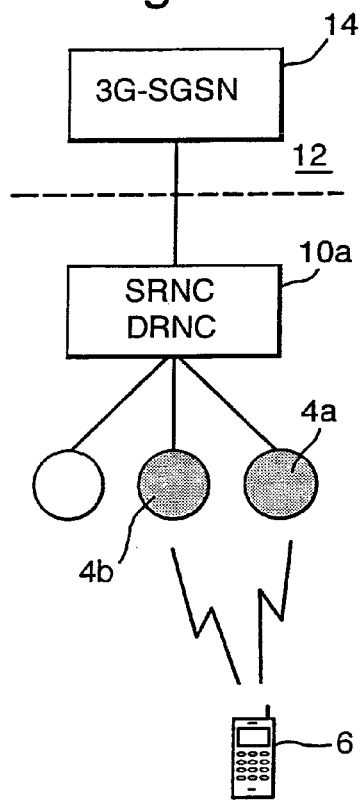
FIG. 2A shows a mobile station in communication with two base stations under the control of a single radio network controller.

Reference is made to FIG. 2A. In FIG. 2A, a mobile station 6 is in communication with two base stations 4a and 4b. Each of these base stations 4a and 4b is connected to the same radio network controller RNC 10a. The common radio network controller 10a is thus the serving radio network controller and is connected to the core network 12. This core network 12 is represented by the dashed line and is the part of the network upstream of the serving radio network controller. The serving radio network controller 10*a* is in fact connected to the third generation serving GPRS support node 3G-SGSN 14 of the core network 12.

Figure 2B:
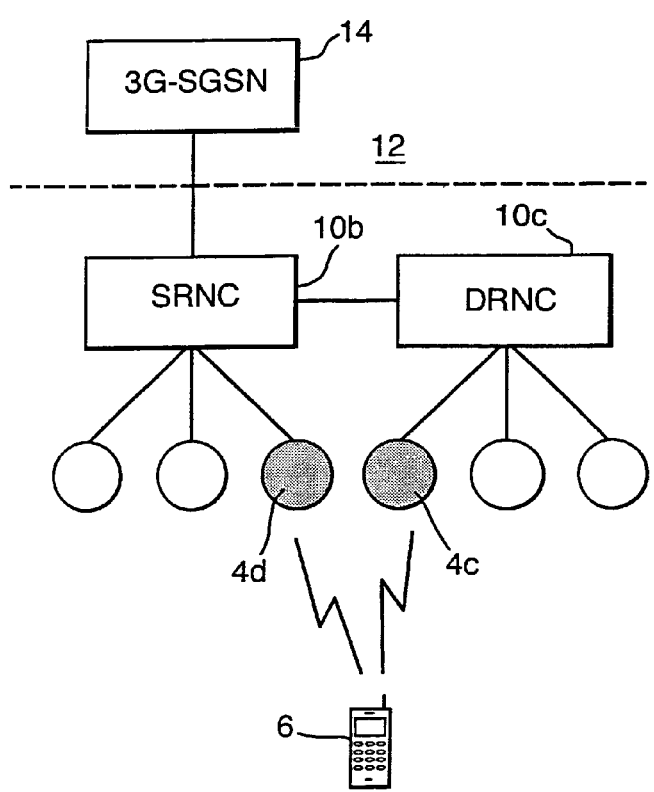
FIG. 2B shows a mobile station in communication with two base stations, each of which is connected to a different radio network controller.

Reference is now made to FIG. 2B which shows the mobile station 6 connected to two base stations 4*c* and 4*d*. However, unlike in FIG. 2A, one base station 4*c* is connected to one radio network controller 10*c* whilst the other base station 4*d* is connected to a second radio network controller 10*b*. One of these radio network controllers acts as the serving radio network controller SRNC 10*b*. In the embodiment shown in FIG. 2B, the second radio network controller 10*b* acts as the serving radio network controller. The other radio network controller 10*c* is defined as being a drift radio network controller DRNC. The drift radio network controller 10*c* is connected to the serving radio network controller 10*b*. The serving radio network controller 10*b* is, as in the arrangement shown in FIG. 2A, connected to the SGSN 14. In the arrangement shown in FIG. 2A, the drift radio network controller and the serving radio network controller are the same radio network controller.

The serving radio network controller 10*a* or *b* is able to combine information received from the mobile station 6 via the two different base stations 4*a*-*d*, regardless of whether or not the base stations are connected to the same radio network controller or different radio network controllers. In the latter situation, the drift radio network controller 10*c* would forward information from the respective base station 4*c* to the serving radio network controller 10*b*. The serving radio network controller 10*b* also copies information which is intended for a given mobile station 6 to the relevant drift radio network controller 10*c* so that the base station 4*c* connected to the serving radio network controller 10*b* as well as the base station connected to the drift radio network controller 10*c* can be transmit the same information, where appropriate, to the mobile station 6.

The serving radio network controller SRNC is arranged to control the information transfer and request for radio resources from the appropriate drift radio network controllers DRNC. The drift radio network controllers only relay information between the mobile station and the serving radio network controller SRNC.

It is preferred that the same serving radio network controller SRNC be used for packet switched traffic (i.e. data transmitted in packet form) and circuit switched traffic i.e. speech.

Figure 3A:
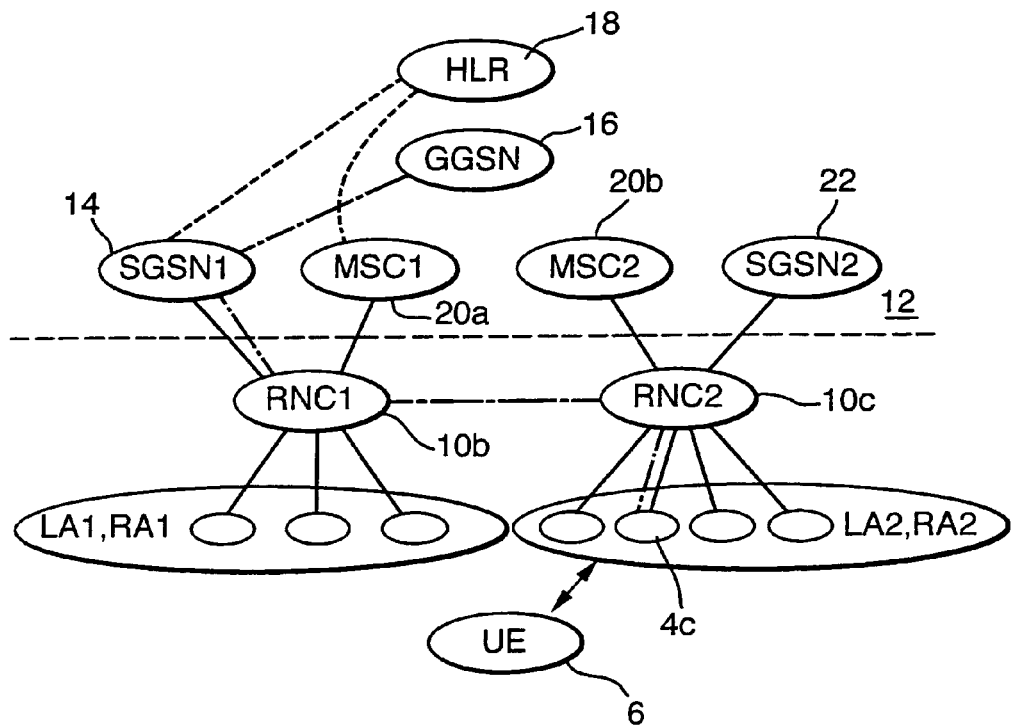
FIG. 3A shows the connection before the serving radio network controller is changed.

When a mobile station moves, the base station or base stations with which the mobile station is in communication needs to change. This may mean that a different serving radio network controller may be required. This is described in relation to FIGS. 3A and 3B. In the arrangement shown in FIG. 3A, the mobile station 6 is in communication with a single base station 4. This base station 4 is connected to the drift radio network controller 10*c*. The drift radio network controller is connected to the serving radio network controller 10*b*, as shown in FIG. 2B. The serving radio network controller is connected to the current SGSN 14 which is in turn connected to the gateway GPRS serving node 16. Accordingly, signals to and from the mobile station follow the following path: mobile station 6 to the base station 4*c* connected to the drift RNC 10*c*, to the drift RNC 10*c*, from the drift RNC 10*c* to the serving RNC 10*b*, from the serving RNC 10*b* to the current SGSN 14 and from the current SGSN 14 to the GGSN 16. The same path is used for signals from the GGSN 16 to the mobile station 6, but in reverse.

The SGSN 14 also has a connection to a home location register 18. Each radio network controller 10*b* and 10*c* is connected to respective 3G mobile services switching centres 20*a* and 20*b*. The drift radio network controller 10*c* is connected to a different serving GPRS support node 22, which is not in use in this mode. There is also a connection between the home location register 18 and the third generation mobile services switching center 20*a* connected to the serving radio network controller 10*b*.

Figure 3B:
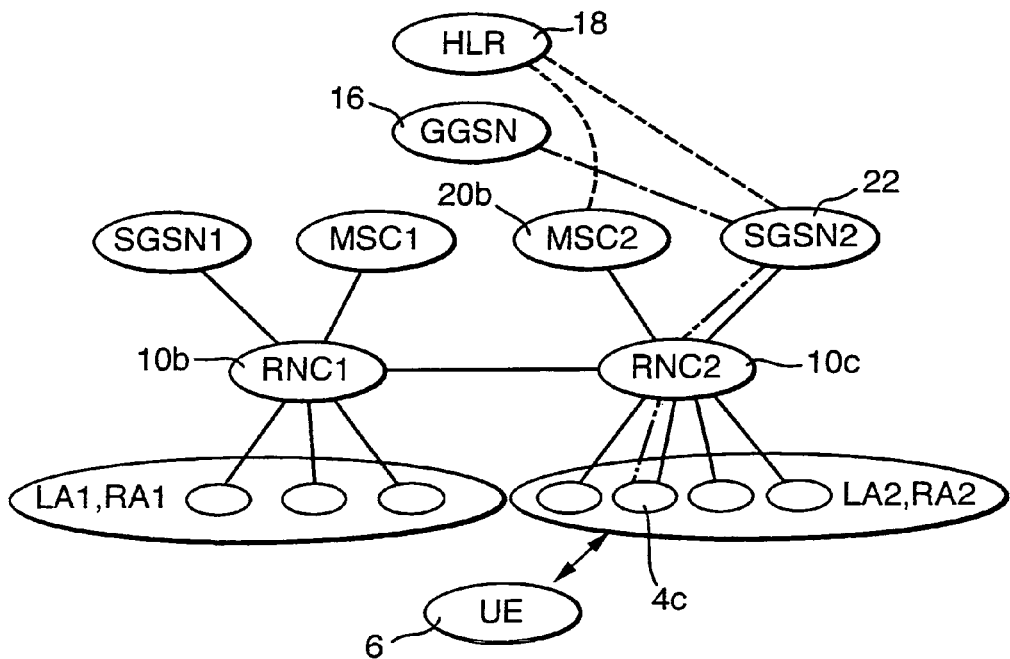
FIG. 3B shows the connections after the serving radio network controller has been changed.

Reference is now made to FIG. 3B which shows the connections which are established once the serving radio network controller has changed. In this arrangement, the drift radio network controller 10*c* becomes the serving radio network controller. The serving radio network controller 10*b* may become a drift radio network controller or may not be involved in communications with the mobile station 6. The mobile station continues to send and receive signals from the base station 4*c* connected to the new serving radio network controller 10*c*. The new serving radio network controller 10*c* has established a connection with the SGSN 22 to which it is connected. Signals from the serving GPRS node 22 connected to the new serving radio network controller 10*c* are passed to the GGSN 16. A connection is established between the home location register HLR 18 and the mobile services switching centre 20*b* connected to the new serving radio network controller 10*c*. A connection is also established between the home location register 18 and the SGSN 22 connected to the new serving radio network controller 10*c*.

This relocation procedure takes place when the target radio network controller (i.e. a drift radio network controller) is controlling all of the communications to and from the mobile station. In other words, the serving radio network controller does not communicate with the mobile station 6 with any of the base stations which it controls.

The connection between the mobile station 6 and the GGSN 16 is now via the base station 4*c*, the new serving radio network controller 10*c*, and the new SGSN 22.

Figure 4:
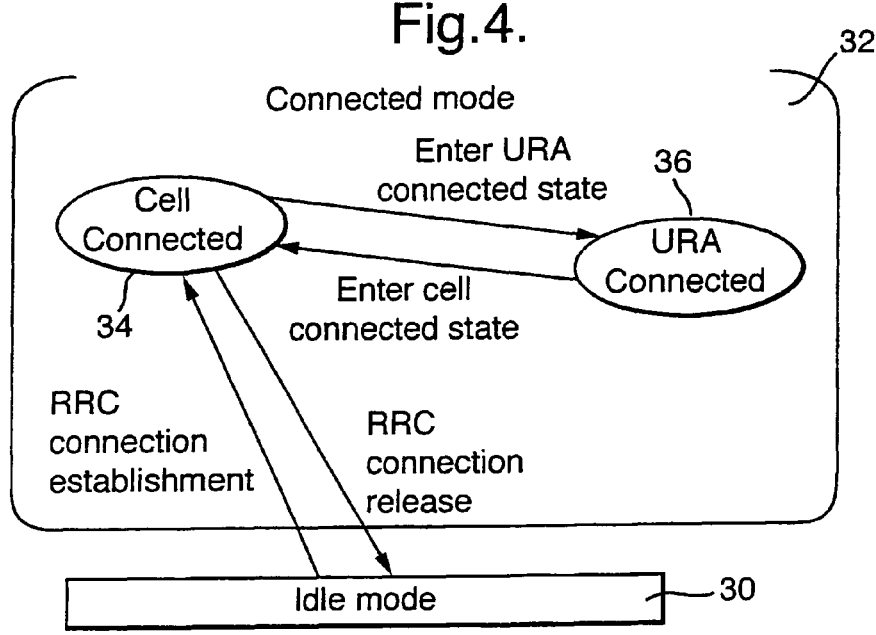
FIG. 4 shows the various radio resource control modes.

Radio resource control provides the common control and signalling between the radio network controller and the mobile station. The same radio resource control connection is used both by speech and packet data traffic. The radio resource control (RRC) modes are illustrated schematically in FIG. 4. In the RRC-idle mode 30, there is no connection established between the mobile station and the universal mobile telecommunications system terrestrial radio access network (UTRAN). UTRAN is the combination of RNC(s) and BTS(s). If the user equipment is attached to the network, but in RRC-idle mode (which implies that the mobile is not in active communication), the location is tracked by the SGSN. In this mode, there is no signalling between the UTRAN and the mobile station except for system information that is sent from the network downlink on a broadcast channel to the user equipment. The user equipment can also receive paging messages in this mode. No information on the mobile station is stored in the UTRAN in this state.

In the connected mode 32, the main states are the cell connected state 34 and the UTRAN Registration Area (URA) connected state 36. One radio network controller will be acting as the serving radio network controller and a radio resource control connection is established between the mobile station and the serving radio network controller. When the position of the mobile station is known on the cell level, the mobile station is in the cell connected state. The radio resource control connection mobility is handled by hand over procedures. In this state, the radio link may be use different channels:—

1. Dedicated Channel (DCH). In this channel, a spreading code is allocated to the mobile station and is solely used by that mobile station.
2. Dedicated Shared Channel (DSCH). In this channel, a spreading code is shared amongst a number of mobile stations. The radio channel is optimised for packet traffic.
3. Common Channel on the downlink and Random Access Channel on the uplink. These are common channels and are suitable for use with short packets.

When the mobile position is known only on the URA level, i.e. which group of cells it is in, the mobile station is in the URA connected state. The URA comprises a set of cells of the network. In other words, the mobile station is in one of a plurality of cells which together define the URA. The URA updating procedures provide the mobility functioning. Paging is performed for downlink packet transfer.

A radio access hearer represents the connection between the SGSN and the mobile station. The radio access bearer comprises two branches. The first branch is the GTP (GPRS tunneling protocol) tunnel between the radio network controller and the SGSN. The second branch is between the mobile station and the radio network controller. Between one mobile station and the SGSN, there are as many radio access bearers as there are PDP (packet data protocol) context activated when a radio access bearer is established. A radio resource control connection is established between the mobile station and the radio network controller, for signalling. However, no radio access bearer may be established. A radio access bearer is established only when the connection between the radio network controller and the SGSN is also established.

Figure 5:
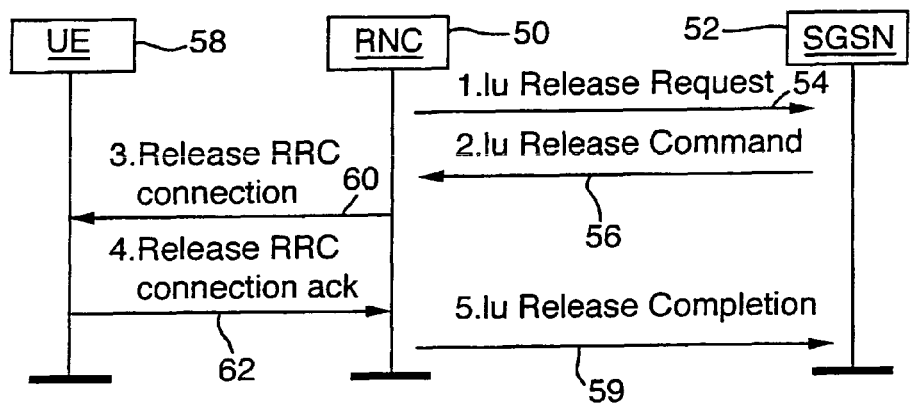
FIG. 5 shows a first embodiment of the present invention.

Reference is now made to FIG. 5. In this arrangement inside the radio network controller 50, a process determines that the RRC Connection of a particular mobile station should be released to optimise the use of resources. By releasing the connection which otherwise uses unnecessary signalling, the radio resources of the network are conserved, thus improving capacity and/or quality. The radio network controller 50 therefore sends an Iu release request 54 to the SGSN 52. Iu is the interface between the radio network controller and the SGSN 52. The request sent to the SGSN 52 indicates the reason why the bearer should be released. In the embodiments of the invention, the connection may be broken in order to optimise resources. This will be described in more detail hereinafter.

It is known to release the connection if the operation and maintenance controller of the network has intervened and wants the connection to be broken or if there is equipment failure at some point between the mobile station and the SGSN 52.

The SGSN 52 decides whether or not to confirm the request for the release of the radio bearer. If the SGSN 52 agrees that the connection should be broken, a release command 56 is sent to the radio network controller 50 via the Iu interface.

If the radio resource connection between the radio network controller 50 and the mobile station 58 has not already been released, the radio network controller sends a radio resource control connection release message 60 to the mobile station. The mobile station releases the connection and sends a radio resource control connection released message 62 to the radio network controller 50. The radio network controller 50 then sends a confirmation 59 that the connection has been released to the SGSN 52 on the Iu interface.

Figure 6:
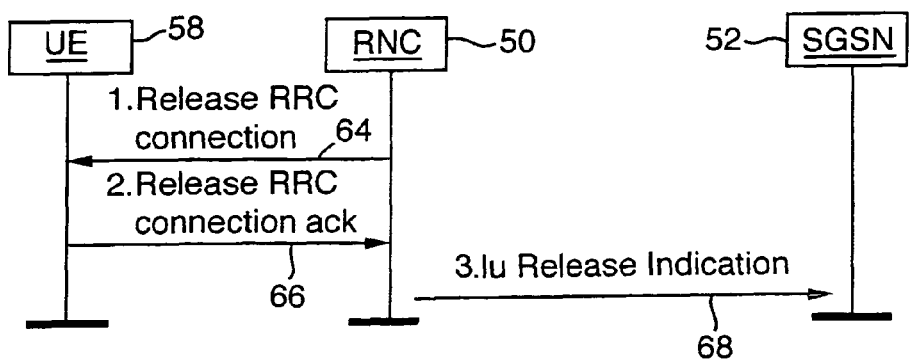
FIG. 6 shows a second embodiment of the present invention.

Reference is now made to FIG. 6 which shows an alternative embodiment to that shown in FIG. 5. In the embodiment shown in FIG. 6, the radio network controller 50 does not send a release request to the SGSN 52. Instead, the RNC 50 sends a release radio connection message 64 to the mobile station 58. The mobile station sends an acknowledgement message 66 to the radio network controller 50 and the connection therebetween is broken. The radio network controller 50 then advises the SGSN 52 via the Iu interface that the connection has been released. The SGSN 52 then releases all of the Iu connections. This alternative signalling is applicable particularly if there is no need of confirmation from the SGSN. The RNC process which triggers the signalling procedure shown in FIG. 5 or 6, should make the decision to release the RRC connection of a particular mobile station based (among other things) on the quality of service profile of the radio access bearer established. The process may only release the RPC connection, if the quality of service profile indicates that this bearer(s) are used for bursty traffic between the SGSN 52 and the mobile station 58. This type of traffic is indicated by the traffic class parameter.

One class of traffic is referred to background traffic whilst the other type of traffic is interactive traffic. Background traffic is, for example message traffic which is not time sensitive whilst interactive traffic is, for example traffic resulting in web browsing. With both of these types of traffic, the SGSN is unable to predict when and what traffic is to be forwarded to the mobile station and likewise when and what traffic is going to be received from the mobile station. The radio network controller carries out a process to control the release of the bearer for one or more of the following reasons:

1. The radio network controller has a timer which measures the time since the last packet was transferred to or received from the mobile station. If a given time lapses without a packet being transferred, then the radio network controller releases the connection. Different times may be used depending on the quality of services profile, in particular whether or not the traffic is interactive or background traffic. A shorter time may be provided for background traffic.
2. The radio network controller can take into account the radio state of the mobile station. For example, the RNC may release the RRC connection only in the URA connected mode.
3. The connection may be kept when another radio bearer is established, for example from the mobile switching centre to the mobile station via the radio network controller. The reason is that the RNC has to keep this mobile RRC-connected for this circuit switched connection, so that it can maintain the radio access bearer for a packet connection without using additional resources.
4. The radio network controller can take into account the movement of the mobile station. If the mobile station is moving above a given speed, the bearer connection may be released. A fast moving mobile station uses up a relatively large amount of radio resources for updates (e.g. URA updates). The radio network controller could set a maximum number of URA updates, for example 10 and if no user data traffic has been received within that time, the connection could be released. This is an elegant way to take into account the mobile movement.
5. The radio network controller may release the connection if the mobile station enters an area controlled by a different radio network controller. In this regard, reference is made to FIGS. 3*a* and 3*b*.

As mentioned hereinbefore, a combination of these methods may be used for determining if a radio network controller should release the bearer. For example, if a mobile station, which is in the URA update state enters a new radio network controller area, the serving radio network controller can be arranged to release the radio bearer. This may in turn trigger a routing area update from the mobile station. The routing area update is used by mobile to inform the SGSN of its location in RRC-idle mode.

If the bearer is released the internal resources of the radio network controller can be conserved. For example, each time a connection is established, the radio network controller requires some buffer resource to be allocated thereto If a connection is not being used, the buffer resource may be wasted.

In another example, if a mobile station has a circuit switch connection i.e. speech connection, the radio network controller could keep the packet bearer established longer than otherwise. This is because a user is more likely to transfer data during or after a call and the radio network controller would merely have to re-establish that bearer otherwise.

In one modification of the embodiments described hereinbefore, the SGSN could be arranged to give an indication in the bearer set up procedure to the radio network controller whether or not the radio network controller is permitted to suggest the release of the bearer. Rules associated with this may also be transferred from the SGSN to the radio network controller. Those rules may take any suitable form. The indication in the bearer set up may be implicitly derived by the radio network controller from quality of service parameters provided by the SGSN to the radio network controller.

The SGSN could indicate the timer value, or indicate not to release RRC connection if a bearer with particular quality of service profile is established. The SGSN can thus instruct the RNC as to how it should interpret the rules which it has for determining when to release a connection.

Whilst the present invention has referred to mobile stations, it should be appreciated that embodiments of the present invention are applicable to other types of user equipment, for example computer terminals. These computer terminals may be fixed or mobile.

Embodiments of the present invention have been described in the context of a code division multiple access system. It should be appreciated that embodiments of the present invention can be used with any other suitable spread spectrum access technique, frequency division multiple access techniques, time division multiple access technique or hybrids thereof.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. An apparatus comprising a computing device, the computing device comprising a monitor and a determining unit;
    the monitor being configured to monitor more than one parameter related to an active connection between a mobile station and a support node, wherein the support node is within a core network of a cellular communications network, and wherein said more than one parameter includes a parameter comprising an indication of user inactivity; and
    the determining unit being configured to determine whether the connection between said support node and said mobile station is to be released based on the more than one parameter;
    wherein the computing device is further configured to cause the connection between the mobile station and the support node to be established, and further configured to cause the connection to be released in an instance in which there is user inactivity for a predetermined period of time by:
        causing transmission of a release message to an entity within the core network of the cellular communications network, the release message comprising an indication of the reason for releasing the connection,
        receiving a release command from the entity within the core network of the cellular communications network, and
        in response to receiving the release command, causing a connection release message to be sent to the mobile station; and
    wherein the apparatus is external to the core network of the cellular communications network.

2. The apparatus as claimed in claim 1, wherein said computing device is further configured to cause sending of a message to the support node indicating that said connection has been released.

3. The apparatus as claimed in claim 1, wherein being configured to cause transmission of a release message includes being configured to cause sending of a release request for the connection to be released to said mobile station.

4. The apparatus as claimed in claim 1, wherein said computing device is further configured to cause sending of a message to said support node advising that the connection has been released.

5. A cellular communications network, comprising: the apparatus as claimed in claim 1, the mobile station and the support node.

6. The apparatus as claimed in claim 1, wherein said computing device is further configured to cause releasing of the connection between the support node and said mobile station dependent solely on the more than one parameter monitored by said monitor.

7. The apparatus of claim 1, wherein the apparatus is a radio network controller.

8. The apparatus as claimed in claim 3, wherein the computing device is further configured to control the release of said connection.

9. The cellular communications network as claimed in claim 5, wherein said support node is a serving general packet radio service support node.

10. The cellular communications network as claimed in claim 5, wherein said network operates in accordance with a universal mobile telecommunication systems standard.

11. A cellular communications network, comprising:
    the apparatus as claimed in claim 2, the mobile station and the support node.

12. A cellular communications network, comprising:
    the apparatus as claimed in claim 3, the mobile station and the support node.

13. A cellular communications network, comprising:
    the apparatus as claimed in claim 4, the mobile station and the support node.

14. A cellular communications network, comprising:
the apparatus as claimed in claim 8, the mobile station and the support node.

15. The cellular communications network as claimed in claim 9, wherein said cellular communications network operates in accordance with a universal mobile telecommunication systems standard.

16. An apparatus comprising a computing device, the computing device comprising a monitor and a determining unit;
the monitor being configured to monitor more than one parameter related to an active connection between a mobile station and a support node, wherein the support node is within a core network of the cellular communications network, and wherein said more than one parameter includes a parameter comprising an indication of user inactivity based on an elapsed time since a last use of the connection; and
the determining unit being configured to determine whether the connection between said support node and said mobile station is to be released based on said more than one parameter monitored by said monitor,
wherein the computing device is further configured to cause the connection between the mobile station and the support node to be established, and further configured to cause the connection to be released in an instance in which the connection has not been used for a predetermined time by:
causing transmission of a release message to an entity within the core network of the cellular communications network, the release message comprising an indication of the reason for releasing the connection,
receiving a release command from the entity within the core network of the cellular communications network, and
in response to receiving the release command, causing a connection release message to be sent to the mobile station; and
wherein the apparatus is external to the core network of the cellular communications network.

17. The apparatus as claimed in claim 16, wherein the predetermined time depends on the type of traffic for which the connection is intended.

18. The apparatus as claimed in claim 16, wherein the predetermined time depends on the quality of service profile of the traffic for which the connection is intended.

19. A cellular communications network, comprising:
the apparatus as claimed in claim 16, the mobile station and the support node.

20. The apparatus of claim 16, wherein the apparatus is a radio network controller.

21. A cellular communications network, comprising:
the apparatus as claimed in claim 17, the mobile station and the support node.

22. A cellular communications network, comprising:
the apparatus as claimed in claim 18, the mobile station and the support node.

23. An apparatus comprising a computing device, the computing device comprising a monitor and a determining unit;
the monitor being configured to monitor more than one parameter related to an active connection between a mobile station and a support node, wherein the support node is within a core network of a cellular communications network, and wherein said more than one parameter includes a parameter comprising an indication of user inactivity based on a state of said mobile station; and
the determining unit being configured to determine whether the connection between said support node and said mobile station is to be released based on said at least one parameter monitored by said monitor,
wherein the computing device is further configured to cause the connection between the mobile station and the support node to be established, and further configured to cause the connection to be released based on the state of the mobile station by:
causing transmission of a release message to an entity within the core network of the cellular communications network, the release message comprising an indication of the reason for releasing the connection,
receiving a release command from the entity within the core network of the cellular communications network, and
in response to receiving the release command, causing a connection release message to be sent to the mobile station; and
wherein the apparatus is external to the core network of the cellular communications network.

24. A cellular communications network, comprising:
the apparatus as claimed in claim 23, the mobile station and the support node.

25. The apparatus of claim 23, wherein the apparatus is a radio network controller.

26. An apparatus comprising a computing device, the computing device comprising a monitor and a determining unit;
the monitor being configured to monitor more than one parameter related to an active connection between a mobile station and a support node, wherein the support node is within a core network of a cellular communications network, and wherein said more than one parameter includes a parameter comprising an indication of inactivity based on movement of the mobile station; and
the determining unit being configured to determine whether the connection between said support node and said mobile station is to be released based on said at least one parameter monitored by said monitor,
wherein the computing device is configured to cause the connection between the mobile station and the support node to be established, and further configured to cause the connection to be released based on the movement of the mobile station by:
causing transmission of a release message to an entity within the core network of the cellular communications network, the release message comprising an indication of the reason for releasing the connection,
receiving a release command from the entity within the core network of the cellular communications network, and
in response to receiving the release command, causing a connection release message to be sent to the mobile station; and
wherein the apparatus is external to the core network of the cellular communications network.

27. The apparatus as claimed in claim 26, wherein an amount of updating information received in a given time from the mobile station is used as a measure of the movement of the mobile station.

28. A cellular communications network, comprising:
the apparatus as claimed in claim 26, the mobile station and the support node.

29. The apparatus as claimed in claim 27, wherein said updating information comprises universal mobile telecommunication systems terrestrial radio access network registration area updates.

30. A cellular communications network, comprising:
the apparatus as claimed in claim 27, the mobile station and the support node.

31. A cellular communications network, comprising:
the apparatus as claimed in claim 29, the mobile station and the support node.

32. An apparatus comprising a computing device, the computing device comprising a monitor and a determining unit;
the monitor being configured to monitor more than one parameter related to an active connection between a mobile station and a support node, wherein the support node is within a core network of a cellular communications network, and wherein said more than one parameter includes a parameter comprising an indication of inactivity based on a location of the mobile station; and
the determining unit being configured to determine whether the connection between said support node and said mobile station is to be released based on said at least one parameter monitored by said monitor,
wherein the computing device is configured to cause the connection between the mobile station and the support node to be established, and further configured to cause the connection to be released based on the location of the mobile station by:
causing transmission of a release message to an entity within the core network of the cellular communications network, the release message comprising an indication of the reason for releasing the connection,
receiving a release command from the entity within the core network of the cellular communications network, and
in response to receiving the release command, causing a connection release message to be sent to the mobile station; and
wherein the apparatus is external to the core network of the cellular communications network.

33. The apparatus as claimed in claim 32, wherein said more than one parameter further comprises associations of the mobile station with different apparatuses, and said determining unit being further configured to determine that the connection should be released in an instance in which said monitor indicates that the mobile station is associated with a different apparatus.

34. A cellular communications network, comprising:
the apparatus as claimed in claim 32, the mobile station and the support node.

35. A cellular communications network, comprising:
the apparatus as claimed in claim 33, the mobile station and the support node.

36. A method, comprising:
monitoring more than one parameter related to an active connection between a mobile station and a support node, wherein the support node is within a core network of a cellular communications network, and wherein said at least one parameter comprising an indication of user inactivity;
determining, by a network entity that is external to the core network of the cellular communications network, whether the connection between said support node and said mobile station is to be released based on said more than one parameter, wherein the network entity comprises a computing device; and
causing the connection to be released based on said more than one parameter by:
causing transmission of a release message to an entity within the core network of the cellular communications network, the release message comprising an indication of the reason for releasing the connection;
receiving a release command from the entity within the core network of the cellular communications network; and
in response to receiving the release command, causing a connection release message to be sent to the mobile station.

37. The method as claimed in claim 36, further comprising causing a message to be sent to the support node indicating that said connection has been released.

38. The method as claimed in claim 36, wherein causing transmission of the release message includes causing transmission of the release message to said mobile station as a request for the connection to be released.

39. The method as claimed in claim 36, further comprising controlling the release of said connection.

40. An apparatus, comprising a computing device, the computing device being configured to direct the apparatus at least to:
monitor more than one parameter related to an active connection between a mobile station and a support node, wherein the support node is within a core network of a cellular communications network, and wherein said more than one parameter includes a parameter comprising an indication of user inactivity based on a state of said mobile station;
determine whether the connection between said support node and said mobile station is to be released based on said more than one parameter; and
cause the connection to be released based on said more than one parameter by:
causing transmission of a release message to an entity within the core network of the cellular communications network, the release message comprising an indication of the reason for releasing the connection,
receiving a release command from the entity within the core network of the cellular communications network, and
in response to receiving the release command, causing a connection release message to be sent to the mobile station; and
wherein the apparatus is external to the core network of the cellular communications network.

41. The apparatus of claim 40, wherein said support node is a serving general packet radio service support node.

42. A method, comprising:
monitoring more than one parameter related to an active connection between a mobile station and a support node, wherein the support node is within a core network of a cellular communications network, and wherein said more than one parameter includes a parameter comprising an indication of user inactivity based on a state of said mobile station;
determining, by a network entity that is external to the core network of the cellular communications network, whether the connection between said support node and said mobile station is to be released based on said at least one parameter, wherein the network entity comprises a computing device; and
causing the connection to be released based on said at least one parameter by:
causing transmission of a release message to an entity within the core network of the cellular communications network, the release message comprising an indication of the reason for releasing the connection;

receiving a release command from the entity within the core network of the cellular communications network, and in response to receiving the release command, causing a connection release message to be sent to the mobile station.

43. The method as claimed in claim 42, wherein determining whether the connection is to be released includes determining whether the connection is to be released based solely on the more than one parameter monitored.

44. The method as claimed in claim 42, wherein the monitoring comprises monitoring more than one parameter related to the connection between the mobile station and the support node, and wherein the determining comprises determining to release the connection between a network element and said mobile station based solely on the more then one monitored parameter.

45. An apparatus comprising:

monitoring means for monitoring more than one parameter related to an active connection between a mobile station and a support node, wherein the support node is within a core network of a cellular communications network, said more than one parameter including a parameter comprising an indication of user inactivity based on an elapsed time since a last use of the connection; and determining means for determining whether the connection between said support node and said mobile station is to be released based on said more than one parameter, wherein the apparatus further comprises means for causing the connection between the mobile station and the support node to be established, and causing the connection to be released in an instance in which the connection has not been used for a predetermined time by:

causing transmission of a release message to an entity within the core network of the cellular communications network, the release message comprising an indication of the reason for releasing the connection, receiving a release command from the entity within the core network of the cellular communications network, and in response to receiving the release command, causing a connection release message to be sent to the mobile station, and wherein the apparatus is external to the core network of the cellular communications network.

46. An apparatus comprising:

monitoring means for monitoring more than one parameter related to an active connection between a mobile station and a support node, said more than one parameter including a parameter comprising an indication of user inactivity based on a state of said mobile station; and wherein the support node is within a core network of a cellular communications network, determining means for determining whether the connection between said support node and said mobile station is to be released based on said more than one parameter, wherein the apparatus further comprises means for causing the connection between the mobile station and the support node to be established, and causing the connection to be released based on the state of the mobile station by:

causing transmission of a release message to an entity within the core network of the cellular communications network, the release message comprising an indication of the reason for releasing the connection, receiving a release command from the entity within the core network of the cellular communications network, and in response to receiving the release command, causing a connection release message to be sent to the mobile station; and wherein the apparatus is external to the core network of the cellular communications network.

47. An apparatus comprising computing device, the computing device being configured to direct the apparatus at least to:

monitor more than one parameter related to an active connection between a mobile station and a support node, wherein the support node is within a core network of a cellular communications network, and wherein said more than one parameter includes a parameter comprising an indication of user inactivity;

determine whether the connection between said support node and said mobile station is to be released based on said more than one parameter;

cause the connection to be released in an instance in which there is user inactivity for a predetermined period of time by:

causing transmission of a release message to an entity within the core network of the cellular communications network, the release message comprising an indication of the reason for releasing the connection, receiving a release command from the entity within the core network of the cellular communications network, and in response to receiving the release command, causing a connection release message to be sent to the mobile station; and wherein the apparatus is external to the core network of the cellular communications network.

48. The apparatus as claimed in claim 47, wherein said apparatus is further directed to cause sending of a message to the support node advising that the connection has been released.

49. A cellular communications network, comprising:

the apparatus as claimed in claim 47, the mobile station and the support node.

50. An apparatus comprising:

monitoring means for monitoring more than one parameter related to an active connection between a mobile station and an support node, wherein the support node is within a core network of a cellular communications network, said more than one parameter including a parameter comprising an indication of user inactivity based on a location of the mobile station; and determining means for determining whether the connection between said support node and said mobile station is to be released based on said more than one parameter, wherein the apparatus further comprises means for causing the connection between the mobile station and the support node to be established, and further configured to cause the connection to be released based on the location of the mobile station by:

causing transmission of a release message to an entity within the core network of the cellular communications network, the release message comprising an indication of the reason for releasing the connection, receiving a release command from the entity within the core network of the cellular communications network, and in response to receiving the release command, causing a connection release message to be sent to the mobile station; and wherein the apparatus is external to the core network of the cellular communications network.

51. A non-transitory computer readable storage medium encoded with instructions that, if executed by a computer, perform a process, the process comprising:
- directing establishment of an active connection between a mobile station and a support node in a communication network through a radio network controller;
- monitoring, at the radio network controller, more than one parameter related to the connection between the mobile station and the support node, where the more than one parameter includes a parameter comprising an indication of a user inactivity;
- determining, at the radio network controller, whether the connection between said support node and said mobile station is to be released based on said more than one parameter; and
- directing releasing, by the radio network controller, of the connection between said support node and said mobile station based on said more than one parameter by:
  - causing transmission of a release message to an entity within the core network of the cellular communications network, the release message comprising an indication of the reason for releasing the connection,
  - receiving a release command from the entity within the core network of the cellular communications network, and
  - in response to receiving the release command, causing a connection release message to be sent to the mobile station; and
- wherein the support node is within a core network of the cellular communications network, and
- wherein the radio network controller is external to the core network of the cellular communications network.

52. The computer readable storage medium as claimed in claim 51, wherein determining to release said connection in an instance in which there is user inactivity for a predetermined period of time.

53. The computer readable storage medium as claimed in claim 51, wherein the monitoring comprises monitoring the more than one parameter related to the connection between the mobile station and the support node, wherein the determining comprises determining to release the connection between a network element and said mobile station based solely on the more than one monitored parameter.

* * * * *

UNITED STATES PATENT AND TRADEMARK OFFICE
CERTIFICATE OF CORRECTION

| | | Page 1 of 1 |
|---|---|---|
| PATENT NO. | : 7,974,630 B1 | |
| APPLICATION NO. | : 09/980376 | |
| DATED | : July 5, 2011 | |
| INVENTOR(S) | : Haumont et al. | |

It is certified that error appears in the above-identified patent and that said Letters Patent is hereby corrected as shown below:

Column 5,
Line 7, "radio access hearer" should read --radio access bearer--.

Column 6,
Line 14, "the RPC" should read --the RRC--.

Signed and Sealed this
Second Day of October, 2012

David J. Kappos
*Director of the United States Patent and Trademark Office*